United States Patent Office 3,249,130
Patented May 3, 1966

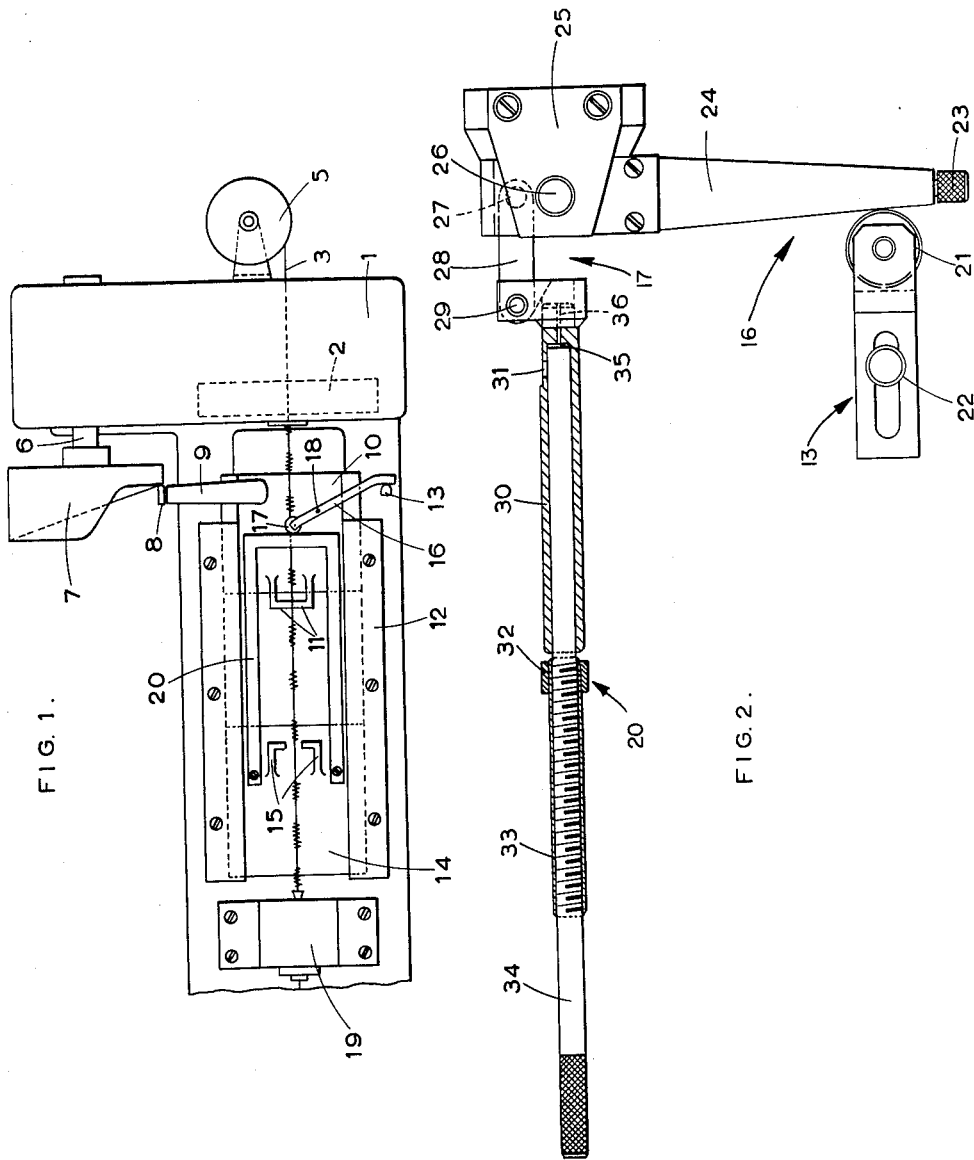

---

3,249,130
APPARATUS FOR MANUFACTURING GRIDS FOR ELECTRON TUBES
Earle Samuel Kelly, Ewell, Surrey, England, assignor to North American Philips Company, Inc., New York, N.Y., a corporation of Delaware
Filed Feb. 1, 1963, Ser. No. 255,618
Claims priority, application Great Britain, May 30, 1962, 20,853/62
2 Claims. (Cl. 140—71.5)

The present invention relates to a method of making grids intended for use in electron discharge tubes or the like, by winding wire on notched backbones, severing the wire by breaking it and then winding another grid on another part of the backbones.

Copending application Serial No. 727,140, filed April 8, 1958, now Patent Number 3,154,113, in the name of Gerard Moesker and assigned to the assignee hereof discloses a method of making grids for use in electron discharge tubes or the like by winding wire on the backbones to form a grid, severing the grid wire by breaking it from the backbones (fully disclosed in U.S. Patent No. 3,102,560), axially displacing the backbones, reconnecting the wire and winding the next grid, which method comprises the steps of gripping the backbones with a pair of feeding jaws, moving the backbones longitudinally at such a speed as to wind the wire on them with the desired pitch or pitches, bringing the feeding jaws and backbones to a standstill, gripping the backbones by means of a pair of stretching jaws which co-act with the pair of feeding jaws so as to stretch a wound portion of the backbones between pairs of jaws, opening the pair of feeding jaws and returning it to its starting position at which position the feeding jaws are closed, opening the pair of stretching jaws to permit the wound backbones to be fed therethrough for further processing and returning the pair of stretching jaws to its starting position.

Furthermore, according to the above-identified application Patent (3,154,113) the wound backbones, after being stretched by the two pairs of jaws, may be cut to length by cutting members to form individual grids which are temporarily supported on a mandrel co-acting with grid-shaping members, and the shaped grids subsequently removed from the mandrel by an axial displacement of the latter. The wound backbones may be heated during the stretching operation and then passed through a chamber to which a reducing gas is supplied, which chamber may be disposed between the pair of stretching jaws and the cutting members.

The present invention provides a modification of this method wherein instead of gripping and stretching the backbones with the pair of stretching jaws after the pair of feeding jaws has been brought to a standstill, a wound portion of the backbones between the two pairs of jaws is stretched during the movement of the backbones by feeding jaws, by gripping the backbones with the pair of stretching jaws and moving the stretching jaws at a faster rate than the pair of feeding jaws after which the feeding jaws release their grip of the backbones and return to their starting position and the stretching jaws release their grip on the backbones and return to their starting position.

The pair of feeding jaws may be arranged to grip the backbones at its starting position before the stretching jaws release their grip of the backbones adjacent a preceding wound portion and return to their starting position.

The above-noted Patent 3,154,113 further discloses a machine for making grids for use in electron discharge tubes or the like by winding wire on backbones and having a path along which the backbones travel during manufacture, which machine comprises in succession along the path a device for supplying grid backbones, a winding head for winding wire on the backbones, means for severing the grid wire and commencing rewinding the wire on the backbones at a point spaced from the previously wound portion; a pair of feeding jaws for intermittently moving the backbones in an axial direction, and a pair of stretching jaws, the arrangement being such that the pair of feeding jaws and the pair of stretching jaws grip spaced portions of the backbones and co-act with one another so as to stretch a wound portion between them.

Cutting members for cutting the wound backbones into grid lengths and an axially movable mandrel co-acting with grid-shaping members and with a member for removing each completed grid from the mandrel may be located in the path of the backbones after the pair of stretching jaws. A device for heating the wound backbones may be disposed between the two pairs of jaws, and a chamber to which a reducing gas can be supplied and through which chamber the wound backbones are movable may be provided between the pair of stretching jaws and the cutting members.

The present invention provides a modification of such a machine comprising means for moving said pair of stretching jaws during movement of said pair of feeding jaws such that a wound portion of the backbones between the two pairs of jaws is stretched during its axial passage through the machine.

The moving means may comprise a lever movable about a pivot fixed relative to the pair of feeding jaws, whereby in operation one end of the lever engages a fixed stationary member so that during axial movement of the pair of feeding jaws the lever pivots and its other end engages a member fixed to the pair of stretching jaws and causes the pair of stretching jaws to move at a faster rate than the pair of feeding jaws.

In order that the invention may be readily carried into effect, two embodiments thereof will now be described, by way of example, with reference to the accompanying drawings, wherein FIGURE 1 is a schematic illustration of a machine for making grids, according to this invention and FIGURE 2 shows a presently preferred form of lever for use on the machine shown in FIGURE 1, comprising the improvement according to this invention.

FIGURE 1 shows a grid winding machine which is basically similar to that shown in FIGURE 1 of Patent No. 3,154,113. In a driving gear case 1, a winding head 2 rotates around a guide for grid backbones 3 which are unwound from a pair of reels 5; in FIGURE 1 the reels and backbones are in line so that only one backbone is visible.

As disclosed in U.S. Patent 3,102,560 the winding head 2 winds turns of thin grid wire onto the backbones so as to form a wound grid; the wire is then broken from the backbones at some distance from the point where the succeeding set of turns is wound forming the next grid.

A shaft 6 projects from the driving gear case 1 and carries a cam 7 which, through a roller 8 and an arm 9, drives a slide 10 having wire-gripping means comprising a pair of feeding jaws 11 movably supported in guides (not shown), and adapted to be opened and closed periodically by any suitable means (not shown). The jaws 11 are adapted to grip the backbones 3 and to impart to them a longitudinal movement, derived from the motion of the slide 10 and the cam 7, so that the wire turns are given the required constant or variable pitch. The slide 10 is movable in a guide 12 which also supports a further slide 14.

The slide 14 has wire-gripping means comprising a pair of stretching jaws 15 movably supported in guides (not shown), and also adapted to grip the backbones 3.

The slide 10 carries a lever 16 which is mounted on pivot 18. One end of the lever 16 is arranged to abut against a stop 13 and the other end carries a roller 17 arranged to bear upon a bracket 20 secured to the slide 14.

The two pairs of jaws are arranged so that current can be passed through the wound backbones between them in order to heat the backbones during the stretching operation described above. Next to the stretching jaws 15 is a chamber 19 which is supplied with a reducing gas to remove oxide formed during the hot-stretching operation.

The operation of the machine is as follows.

Before the commencement of winding a grid, the slide 10 occupies the position shown in FIGURE 1. The feeding jaws 11 are closed and move, together with the slide 10, to the left as viewed in FIGURE 1 according to the winding-pitch prescribed. During the first part of this movement, winding does not take place allowing swift transport of the backbones to the left. The slide 10 moves to the left, the end of the lever 16 abuts the stop 13 and the lever 16 rotates in a counter-clockwise direction; the roller 17 is urged against the bracket 20 and moves the slide 14. The stretching jaws 15 close and as wound portion of the backbones 3 between the jaws 11 and 15 is stretched due to the faster rate of travel of the slide 14 relative to the rate of travel of the slide 10. After the backbones are stretched, the jaws 15 open and slide 14 is returned to its initial position in a known manner such as by means of a spring or the like.

After the stretching operation both pairs of jaws come to a standstill and the feeding jaws 11 open. Under the action of a spring (not shown) urging the lever 9 against the cam 7, the slide 10 returns to its starting position. The feeding jaws 11 may close and grip the backbones 3 either before the stretching jaws 15 open and return to their starting position or after. The cycle of operation described above can then begin again.

FIGURE 2 shows a lever arrangement for promoting forward movement of the slide 14 which forms the subject matter of this invention as it is presently preferred.

The lever arrangement comprises a block 25 which is intended to be secured to the slide 10, FIGURE 1, and which is provided with a shaft 26. An arm 24 (schematically shown as 16, FIG. 1) is pivoted about the shaft 26 (represented as 18, FIG. 1) one end of the arm being arranged to abut a wheel 21 provided on a stop 22 (represented as 13, FIG. 1) which is intended to be fixed to a stationary part of the machine. The other end of the arm 24 carries a connecting link comprising a shaft 27 on which is pivoted, at one end, a coupling rod 28. The other end of the coupling rod 28 is pivoted about a shaft 29 mounted on a hollow member 30 provided at a closed end 35 with an air outlet 31 and a narrow bore 36.

A bracket 32 (similar to 20, FIG. 1) intended to be secured to the slide 14, FIGURE 1, carries a sleeve 33 which is internally threaded. A rod 34 having a screw-threaded portion is screwed through the sleeve 33 and protrudes into the member 30 with its end abutting the closed end 35. By screwing the rod 34 into or out of the sleeve 33, the distance between the bracket 32 and the end 35 and hence the distance between the slides 14 and 10, FIGURE 1, may be increased or decreased respectively.

The arm 24 is provided with an adjusting screw 23 which enables the spacing of the shaft 27 from the shaft 26 to be varied; this adjustment enables the speed of the slide 14 to be varied with respect to the speed of the slide 10.

The operation of the lever arrangement is as follows:

FIGURE 2 shows the position of the lever when both slides 10 and 14 are in their starting positions. Both the feeding jaws and the stretching jaws are closed and under the action of the cam 7, FIGURE 1, the slide 10 moves to the left as seen in this view. The arm 24 pivots in a counter-clockwise direction about the shaft 26; the coupling rod 28 moves to the left together with the member 30. The rod 34, abutting the end 35 of the member 30, is pushed to the left and the bracket 32 moves the slide 14, FIGURE 1, to the left and a wound portion of the backbones between the two pairs of jaws is stretched.

Both slides 10 and 14 come to a standstill, the feeding jaws open and the slide 10 together with the block 25 and the member 30 return to their starting positions. The narrow bore 36 prevents the member 30 from exerting a suctional pull on the rod 34.

The slide 14, carrying bracket 20, now returns to its starting position, by spring pressure or other known arrangement, and air between the end 35 of the member 30 and the rod 34 is expelled through a hole 31. As the end of the rod 34 passes the hole 31, the entrapped air within the member 30 is forced through the narrow bore 36 and damps the motion of the rod 34 so that it does not strike the end 35 with too much force.

The cycle of operation described above then recommences. The member 30 may be formed with only one hole at its end 35 instead of the two holes 31 and 36 described above. Alternatively, if the rod 34 is loosely fitted inside the member 30 no hole need be provided.

I claim:

1. An apparatus for manufacturing grids for electron tubes in which a winding head winds grid wire on spaced parallel grid backbones to form a grid, severs said wire by breaking and re-secures said wire to one of said backbones for winding another grid, and having jaw means for feeding the grid backbones through said apparatus and stretching said grid backbones; the combination with said jaw means comprising, means including a slide for driving a pair of feeding jaws carried on said slide for determining the number and pitch of grid wire turns on said backbones, means for driving a pair of movable stretching jaws at a greater velocity than said feeding jaws for stretching said backbones, said means for driving said stretching jaws comprising a lever pivotally secured on said slide, one end of said lever engaging a fixed stop, and means for coupling the other end of said lever with said stretching jaws, the distance between said pivot and the end of said lever engaging the fixed stop being greater than the distance between said pivot and said other end of said lever.

2. Apparatus according to claim 4 wherein the lever of said means for driving said stretching jaws comprises a block mounted on said slide, an arm pivotally secured on said block, said arm being adapted for engagement at one end with said fixed stop, a connecting link means pivotally secured at the end of said arm remote from said stop engaging end, a hollow member pivotally connected at one end of said connecting link means, a rod slideably movable within said hollow member and extending therebeyond; said coupling means comprising a bracket member secured on said rod spaced from said hollow member, said bracket being connected with a second slide carrying said stretching jaws, said hollow member having a bleed hole at the end thereof adjacent said connecting link and means for adjusting said space between said bracket and said hollow member for determining the operating distance between said feeding and stretching jaws.

References Cited by the Examiner

UNITED STATES PATENTS

| | | | |
|---|---|---|---|
| 1,976,522 | 10/1934 | Rose | 140—71.5 |
| 2,181,288 | 11/1939 | Washburn | 140—71.5 |
| 2,778,386 | 1/1957 | Lindsay | 140—71.5 |
| 2,820,487 | 1/1958 | Bahm | 140—71.5 |
| 2,995,156 | 8/1961 | Gartner et al. | 140—71.5 |
| 3,139,120 | 6/1964 | Beezer et al. | 140—71.5 |
| 3,151,636 | 10/1964 | Mahr et al. | 140—71.5 |
| 3,154,113 | 10/1964 | Moesker | 140—71.5 |

CHARLES W. LANHAM, *Primary Examiner.*

K. C. PECK, *Examiner.*

E. W. NYPAVER, W. H. JUST, *Assistant Examiners.*